(No Model.)
A. NAWADNY.
FAN ATTACHMENT.
No. 315,320. Patented Apr. 7, 1885.
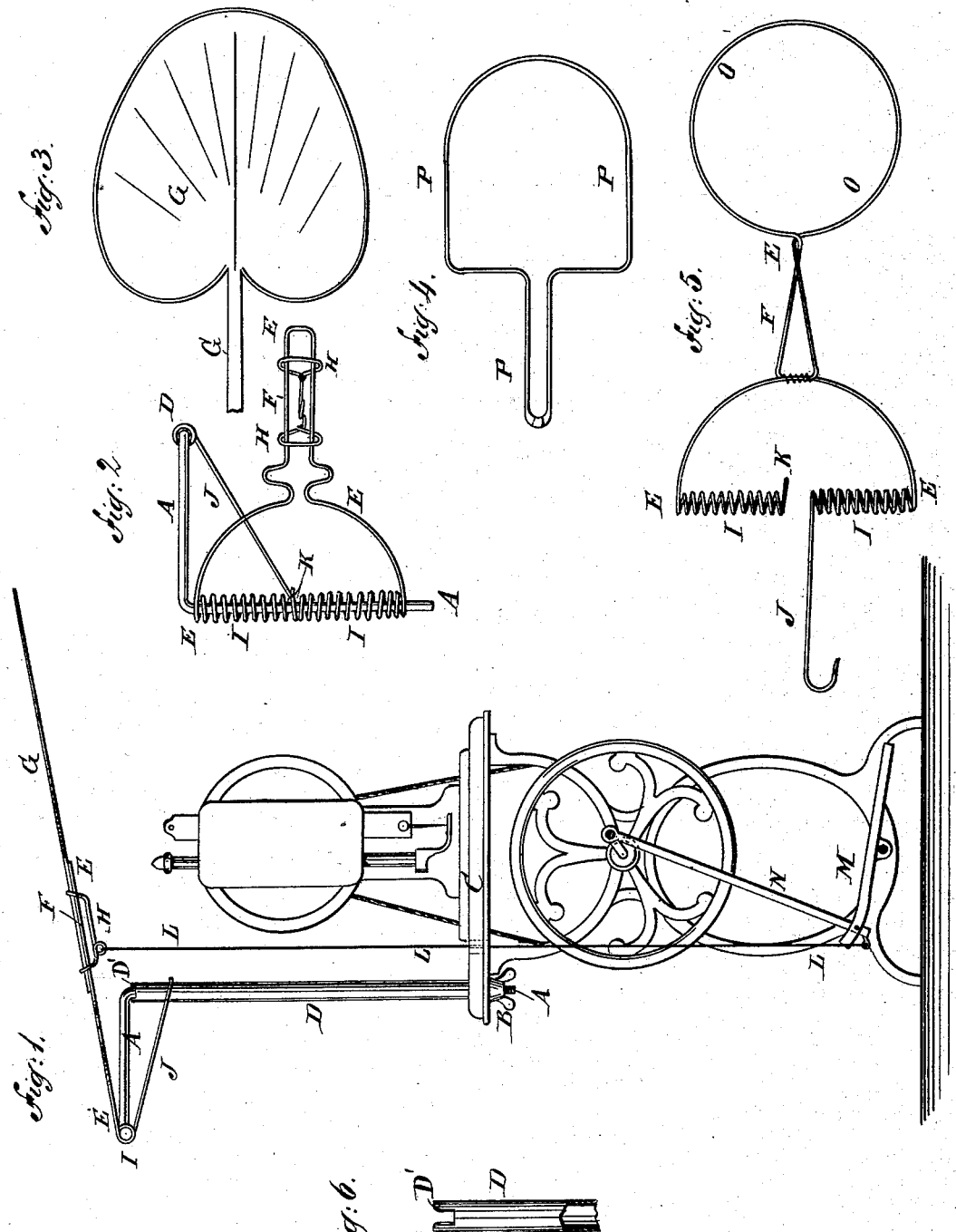
WITNESSES:
INVENTOR:
A. Nawadny
BY
ATTORNEYS.

UNITED STATES PATENT OFFICE.

ALBERT NAWADNY, OF NEW ORLEANS, LOUISIANA, ASSIGNOR TO ALEXANDER L. APFFEL AND CAMILLE A. BAUD, BOTH OF SAME PLACE.

FAN ATTACHMENT.

SPECIFICATION forming part of Letters Patent No. 315,320, dated April 7, 1885.

Application filed July 29, 1884. (No model.)

*To all whom it may concern:*

Be it known that I, ALBERT NAWADNY, of New Orleans, in the parish of Orleans and State of Louisiana, have invented certain new and useful Improvements in Fan Attachments, of which the following is a full, clear, and exact description.

Reference is to be had to the accompanying drawings, forming part of this specification, in which similar letters of reference indicate corresponding parts in all the figures.

Figure 1 is a side elevation of my improvement shown as applied to a sewing-machine. Fig. 2 is a plan view of the improvement. Fig. 3 represents a palm-leaf fan. Fig. 4 represents a wire frame for a fan. Fig. 5 represents the spring and a wire fan-frame formed in one piece; Fig. 6, a side elevation of the upper part of the tube.

The object of this invention is to provide a fan attachment constructed in such a manner that they can be readily applied to and detached from sewing-machines and other supports.

The invention consists in a fan attachment constructed with a bent rod provided with a tube and hand-nut for securing it to a support, a fan-holder having a fan-receiving stem, and a spiral spring provided with hooked ends, and a connecting-wire whereby the fan can be operated from a treadle. The stem of the fan-holder is provided with a fastening for securing the handle of a fan to the said holder.

I will describe my attachment as applied to a sewing-machine, but do not limit myself to that use, as it can be applied with advantage to printing-presses, desks, beds, tables, and other supports.

A represents a rod, which is bent twice at right angles, as shown in Figs. 1 and 2.

Upon the lower end of the rod A is formed a screw-thread to receive the hand-nut B, by means of which the said rod is secured to the top of a sewing-machine table, C, or other support. The lower or vertical arm of the rod A passes through a tube, D, the lower end of which rests upon the table-top C, and its upper end is notched at D', to receive the horizontal part of the said rod to hold the said rod from turning.

E is the fan-holder, which is formed of spring-wire, the middle part of which is bent together, so that its parts may be parallel, to form a loop or stem, F, to receive the handle of a fan, G, and to which the said handle is secured by a slide, H, or other suitable fastening.

The end parts of the wire forming the holder E are curved to form spiral springs I, which are placed upon the upper arm of the rod A. One end, J, of the wire is left long, and has a hook formed upon its end to hook upon the tube D. The other end, K, of the wire is short, and is so formed that it can be hooked around the long end or hook J, as shown in Fig. 2, when a strong spring is required, but which can be left free, as shown in Fig. 5, when a weak spring is required.

To the fastening H, or to the stem F of the fan-holder E, is secured the end of the wire L, the other end of which is attached to the treadle M, or to its connecting-rod N, as may be convenient. With this construction the fan G will be drawn down when the treadle M is forced downward, and will be raised by the elasticity of the spring I when the treadle M rises, so that the said fan will be vibrated by the movements of the said treadle. If desired, the stem F can be extended and so bent as to form a wire frame, O, as shown in Fig. 5, which can be covered with paper or cloth to form a fan; or a wire frame, P, can be made as shown in Fig. 4, and covered with paper or cloth to form a fan, as may be desired. By loosening the hand-nut B the rod A can be turned to adjust the fan in any desired position.

Having thus described my invention, I claim as new and desire to secure by Letters Patent—

1. A fan attachment constructed substantially as herein shown and described, and consisting of the bent rod A, provided with a tube, D, and hand-nut B, the fan-holder E, having stem F, spiral springs I, and hook ends J K, and the connecting-wire L, to adapt the attachment to be applied to a support and operated by a treadle, as set forth.

2. In a fan attachment, the combination, with the bent rod, of the looped fan-holder, with its arms formed with springs embracing said rod, and one end of one of said springs provided with an arm connected to a tube surrounding the upright portion of said rod, substantially as and for the purpose set forth.

3. The combination, with the table C and treadle M of a sewing-machine, of the attachment rod A, tube D, and nut B, the fan-holder E, with springs embracing said rod, one of said springs having an arm connected to the upright portion of the tube, and the connecting-wire L, whereby the fan attachment can be readily connected with and operated from the sewing-machine, as set forth.

ALBERT NAWADNY.

Witnesses:
E. J. MERA,
ED. A. PEYROUX.